UNITED STATES PATENT OFFICE.

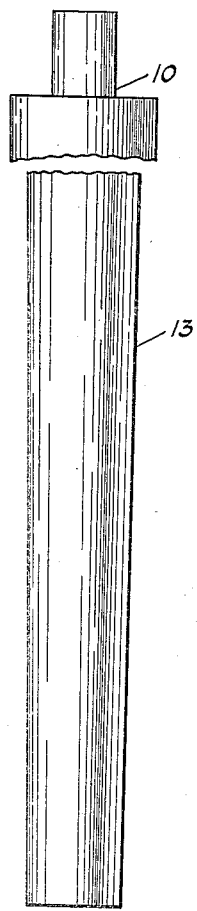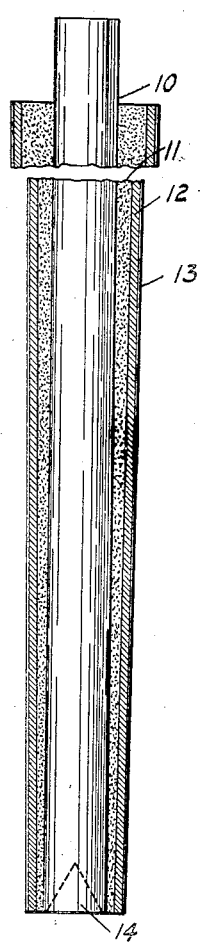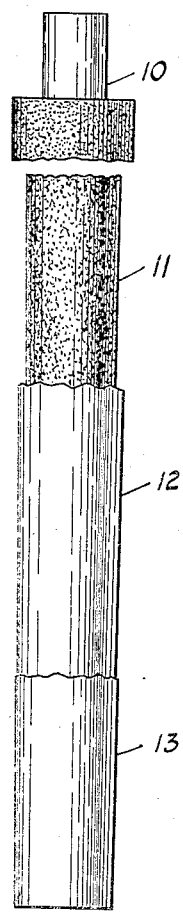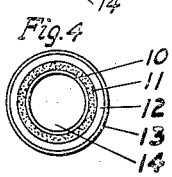

JOSEPH W. FAY, OF MILWAUKEE, WISCONSIN.

ELECTRODE FOR ARC-WELDING.

1,354,476.

Specification of Letters Patent.

Patented Oct. 5, 1920.

Application filed February 27, 1920. Serial No. 361,881.

*To all whom it may concern:*

Be it known that I, JOSEPH W. FAY, a citizen of the United States, residing at Milwaukee, in the county of Milwaukee and State of Wisconsin, have invented certain new and useful Improvements in Electrodes for Arc-Welding, of which the following is a specification.

This invention relates to electrodes used for electric welding purposes, and has for an object providing an improved form of electrode, particularly with reference to the insulation which covers the electrode, special objects being to provide such insulation improvements as will maintain constant the temperature of the electrode as its length decreases in use, and to produce an electrode which will materially simplify the starting of the electric arc. Other objects of the invention will be apparent from a consideration of the accompanying drawings and the following description thereof.

Of the drawing Figure 1 is an elevation of an electrode which embodies features of my invention; Fig. 2 is a central longitudinal section of the electrode; Fig. 3 is an elevation of the electrode with certain portions of the insulation broken away; and Fig. 4 is a view of the arc end of the electrode.

Any suitable material may be used for the electrode proper, and it may be of any suitable shape, diameter and length. In a general way my electrode is particularly adapted to machine welding when the electrode is very long. I prefer for the purpose a metal bar 10. The entire length of that portion of the bar which is to be deposited on the seam to be welded, is inclosed in a thick coating of heat resisting cement 11. Any suitable cement may be used, but I prefer for the purpose a coat of asbestos cement. This cement is applied in such a manner as to taper in thickness from one end to the other, the coating on the arc end of the electrode being somewhat thinner than at the other end. The amount of the tapering of this cement would vary with the length of the electrode and the particular conditions of the welding process, but in general I prefer a variation in thickness substantially as indicated in Fig. 2. Outside of this coat of cement is wrapped one or more layers of paper 12, any suitable paper being used for the purpose. The surface of the paper is then coated by dipping or brushing with an insulating paste 13. Any suitable paste may be used for this purpose, I prefer, however, asbestos powder mixed with silicate of soda.

One object of increasing the thickness of the cement toward the upper or supporting end of the electrode is to insure an even fusing temperature throughout the entire length of the electrode, especially an electrode which is very long, for instance six feet or more in length, and one which is used in machine welding. In such a case there is a material increase of temperature in the body of the electrode, as the terminal or supporting end is being approached, and this excessive temperature weakens the quality of the insulation, as the electrode is decreasing in length, and thus causes a poorer weld, and makes it difficult to operate automatically on account of the variations in the fusing. The object which I have in view is to deposit the metal on the seam to be welded at a uniform time rate regardless of the length of the electrode. If the speed of the machine and the current of electricity passing through the arc of the electrode will deposit one inch of metal to one inch of the seam in one second, the finishing end of the electrode should deposit the same amount of metal in the same length of time. An electrode with a uniform thickness of insulation throughout the entire length will fuse faster as the electrode decreases in length, due to the weakness of the insulation caused by the increase of temperature as the electrode shortens in length.

One of the objects of applying paper to the surface of the cement is to protect the cement from breaking or peeling off in use or otherwise, for instance when being handled roughly by the workmen. And an object of the coat of insulating paste 13 is to prevent the paper from taking up moisture and also to avoid burning the paper by the heat of an arc.

I also provide means in connection with the arc end of the electrode to facilitate the starting of the arc. With an ordinary metal electrode, some difficulty is usually encountered in properly starting the arc. Occasionally the electrode will fuse tight to the work, if not properly handled. I have discovered that by providing special means for allowing the current to flow from the electrode to the work and to have such means so formed that the heat of the current will very quickly melt and perhaps vaporize the metal immediately in contact with the work, the starting of the arc is very materially simplified, and fusing of the electrode to the work is avoided. For this purpose any suitable means may be provided, but I prefer for the purpose to provide in the arc end of the electrode a depression 14 so formed as to leave an annular ring of metal which comes in contact with the work, and thus starts the flow of the current. The walls of the metal, however, are of such thickness that the metal quickly melts and leaves an arcing space between the electrode and the work without the necessity of moving the electrode backward from the work at exactly the right instant. By this arrangement the operator of the electrode in starting the arc need not be so exact and the danger of fusing to the work and other disadvantages are eliminated. It is to be understood, however, that the exact form of the depression or method of reducing the mass of the metal, is not essential so far as the spirit of my invention is concerned, it being necessary only to remove sufficient mass of the metal to cause a high resistance to the flow of electricity through the end of the electrode, and to reduce the mass to such an amount that it will very quickly be melted and more or less vaporized.

I claim as my invention:

1. An electrode for welding purposes comprising a bar of metal, a coat of cement on said bar, a wrapping of paper around said cement, and a coat of paste covering said paper.

2. An electrode for welding purposes comprising a bar of metal, a coat of cement on said bar, a wrapping of paper around said cement, and a coat of paste covering said paper, said cement being composed of asbestos cement.

3. An electrode for welding purposes comprising a bar of metal, a coat of cement on said bar, a wrapping of paper around said cement, and a coat of paste covering said paper, the said paste being composed of asbestos powder mixed with silicate of soda.

4. An electrode for electric welding purposes comprising a metal bar, said bar being covered with a thick coat of heat resisting cement, the coat of cement decreasing in thickness from one end of the bar to the other.

5. An electrode for electric welding purposes comprising a metal bar, said bar being covered with a thick coat of heat resisting cement, the coat of cement decreasing in thickness from one end of the bar to the other, and a wrapping of paper outside of said cement.

6. An electrode for welding purposes comprising a bar of iron, one end of said bar being adapted to be supported, the other end of said bar being adapted to form the terminal for the welding arc, said latter end having a projection extending outwardly therefrom, said projection being a conductor of electricity, the resistance to the flow of electricity through said projection per unit of length being materially greater than the resistance to the flow through said electrode.

7. In an electrode for welding purposes a bar of iron, the arc forming end of said bar having its transverse cross-section materially less than the transverse cross-section of the bar a material distance from said end.

8. An electrode for welding purposes comprising a bar, the arc forming end of said bar having a portion of the metal removed therefrom, whereby the resistance to the flow of electricity through the end of the bar per unit of length is materially greater than at other portions of the bar.

9. An electrode for electric welding purposes comprising a metallic bar, the arc forming end of said bar having a depression therein.

10. An electrode for electric welding purposes comprising a metallic bar, the arc forming end of said bar being countersunk.

In testimony whereof, I hereunto set my hand.

JOSEPH W. FAY.